United States Patent [19]
Kurotaki

[11] 4,432,274
[45] Feb. 21, 1984

[54] ROASTER

[76] Inventor: Kiyomitu Kurotaki, 20-8, 1-chome, Jinnan, Shibuya-ku, Tokyo, Japan

[21] Appl. No.: 447,005

[22] Filed: Dec. 6, 1982

[51] Int. Cl.³ .................... A47J 37/06; F24C 15/20
[52] U.S. Cl. ..................................... 99/400; 99/446; 126/299 E
[58] Field of Search .................. 99/400, 446, 450; 126/39 B, 51, 299 D, 299 E; 134/104, 111

[56] References Cited

U.S. PATENT DOCUMENTS

| | | | |
|---|---|---|---|
| 1,178,290 | 4/1916 | Berry | 126/299 E X |
| 3,322,060 | 5/1967 | Gilbert | 99/450 X |
| 3,433,146 | 3/1969 | Russell | 126/299 E |
| 3,623,423 | 11/1971 | Berger | 99/450 X |
| 3,756,217 | 9/1973 | Field | 99/400 X |
| 4,351,652 | 9/1982 | Wisting | 126/299 E X |

Primary Examiner—Billy J. Wilhite
Assistant Examiner—Christine A. Peterson
Attorney, Agent, or Firm—Wenderoth, Lind & Ponack

[57] ABSTRACT

This invention relates to a roaster having smoke exhaust means to introduce smoke which is produced at a cooking plate for cooking material such as meat, fish and/or vegetables into a collecting exhaust duct having sucking means under a floor without making full indoors. More particularly, this invention relates to a roaster having automatic cleaning means to clean a smoke exhaust passage which tends to have oil adhering thereto and to remove burnt particles which are introduced together with smoke into the smoke exhaust passage and tend to adhere to the wall of the smoke exhaust passage, means to introduce an adjusted quantity of air into a gas burner to produce an optimum heating temperature without extinguishing a flame even though a larger quantity of air is blended with a gas to decrease fuel expenses, means to easily remove smoke which stays under the cooking plate, to provide a heating action suitable for the cooking material and to introduce oil scattered on cooking into the smoke exhaust passage, and means to remove oil or dusts out of smoke until it reaches the collecting exhaust duct.

7 Claims, 8 Drawing Figures

ROASTER

BACKGROUND OF THE INVENTION

There has been proposed a roaster having means to introduce smoke into a smoke exhaust passage within the roaster without making full indoors and exhaust it through a forced exhaust duct outdoors. This is disclosed by U.S. Pat. application Ser. No. 6/165,004 now U.S. Pat. No. 4,335,705 which was filed by the applicant. In the prior application, as shown in FIG. 1, smoke produced at a cooking plate of a roaster 102 on a cooking table 101 is introduced into a smoke exhaust cylindrical member 103 which communicates with a roaster body 102 and also with a smoke collecting duct which in turn communicates with a forced smoke exhaust duct under a floor or a ground. More particularly, the roaster 102 comprises an inner body portion 108 having a juice receiver 104 on which is mounted a mesh-like cooking plate 106 to place cooking material 105 such as meat thereon and a gas burner 107 to produce a flame to heat the cooking material on the cooking plate 106 through openings in the juice receiver 105, and an outer body portion 109 disposed in a spaced manner from the inner body portion 108. The outer body portion 109 has an upper opening and a lower opening provided therein. Smoke produced at the cooking plate 106 is introduced into a smoke exhaust passage 110 between the inner and outer body portions 108 and 109 and forcedly then into the smoke exhaust cylindrical member 103. In the prior roaster, smoke including oil is never exhausted indoors so that the air within the room is never contaminated and so that users (customers) are prevented from having their dresses damaged by oil dust.

However, the prior roaster has various drawbacks. One of them is that dusts such as oil and burnt particles tend to adhere to the wall of the smoke exhaust passage 110. Such dusts possibly rot so as to give out a bad smell. Another drawback is that the hole edges of the juice receiver 104 is deformed by the heat from the burner so that the juice receiver 104 cannot be supported in the inner body portion 108 in an arranged manner. Another drawback is that the prior roaster requires much heating power to roast meat because the burner contains much gas component, which causes the fuel expenses to increase. Furthermore, since oil dust scattered from the cooking plate cannot be fully dropped through the smoke exhaust passage, the table tends to be contaminated by the oil dust and also the smoke exhaust passage tends to be closed. A filter which removes dusts out of the smoke has to be exchanged by opening the floor under which the filter is disposed. This causes the operation of exchanging the filter to be troublesome.

SUMMARY OF THE INVENTION

Accordingly, it is a principal object of the invention to provide a roaster wherein dusts such as oil and burnt particles which tend to adhere to a wall of a smoke exhaust passage can be automatically cleaned or removed so that the smoke exhaust passage is never closed or choked and so that a bad smell is never given out by the dusts adhering to the wall of the smoke exhaust passage.

It is another object of the invention to provide a roaster wherein the dusts such as oil and burnt particles can be positively removed.

It is another object of the invention to provide a roaster wherein oil scattered on an upper portion of a roaster body is adapted to be introduced into a smoke exhaust passage so that oil splash never stays on a table.

It is further object of the invention to provide a roaster wherein an exhaust gas staying under a cooking plate can be positively exhausted into a smoke exhaust passage so that the effectiveness of combustion is more improved.

It is further object of the invention to provide a roaster wherein a portion of a juice receiver facing a burner is adapted to be prevented from being thermally expanded by a flame from the burner so that the juice receiver can be positively disposed within an inner body portion in an arranged manner.

It is further object of the invention to provide a roaster wherein the fuel expenses can decrease and an effective heating action can be provided without any extinguishment of flame.

In accordance with the invention, there is provided a roaster comprising a roaster body having an inner body portion and an outer body portion; a mesh-like cooking plate removably mounted on said inner body portion to place cooking material thereon; a juice receiver containing water therein disposed under said cooking plate; a gas burner disposed in a spaced manner from said juice receiver to direct a flame toward openings provided in said juice receiver; a smoke exhaust passage formed between said inner and outer body portions; a water jet type cleaning nozzle disposed at an upper portion of said smoke exhaust passage; an exhaust gas guide passage provided between said cooking plate and said inner body portion so as to communicate with said smoke exhaust passage; a mesh-like filter provided at a lower opening of said outer body portion; and an exhaust casing provided so as to communicate with said outer body portion and also with a collecting exhaust duct including sucking means and having a filter provided to remove oil out of cleaning water.

BRIEF DESCRIPTION OF THE DRAWINGS

The above and other objects and features of the invention will be apparent from the description of the embodiment taken along with reference to the accompanying drawings in which.

DETAILED DESCRIPTION OF THE EMBODIMENT

Figure 1:
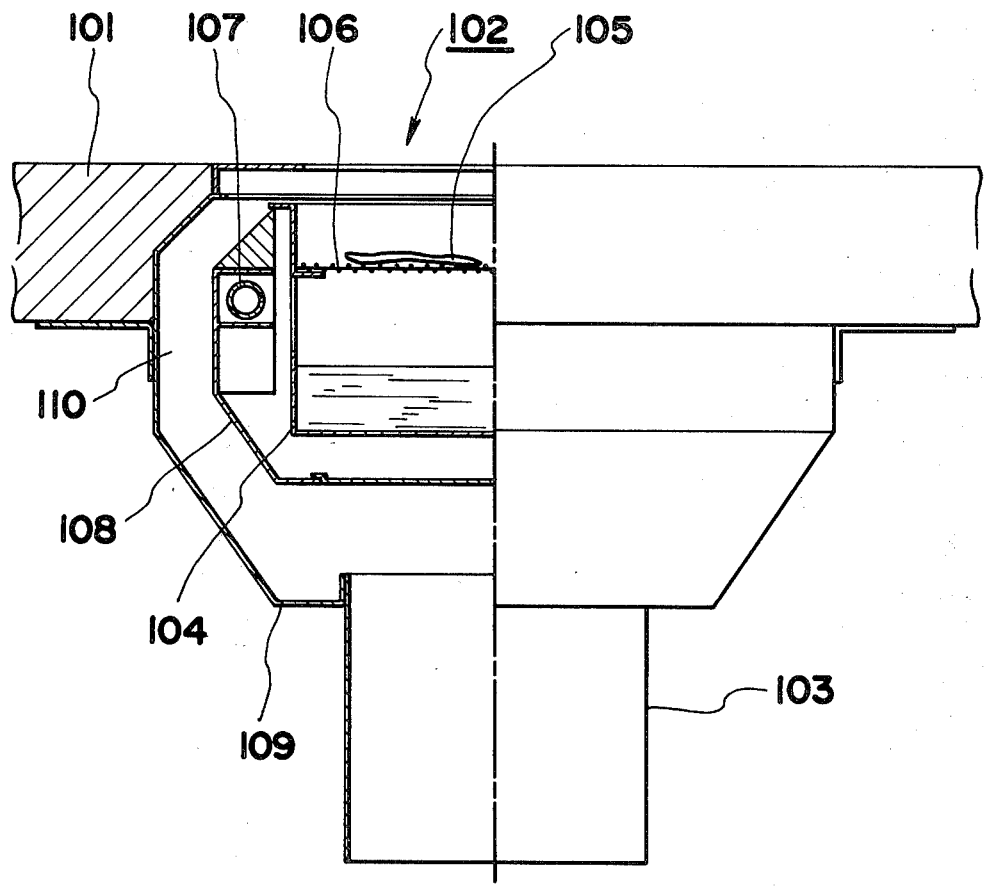
FIG. 1 is a side elevational view of a prior roaster with a half portion taken in section.
Figure 2:
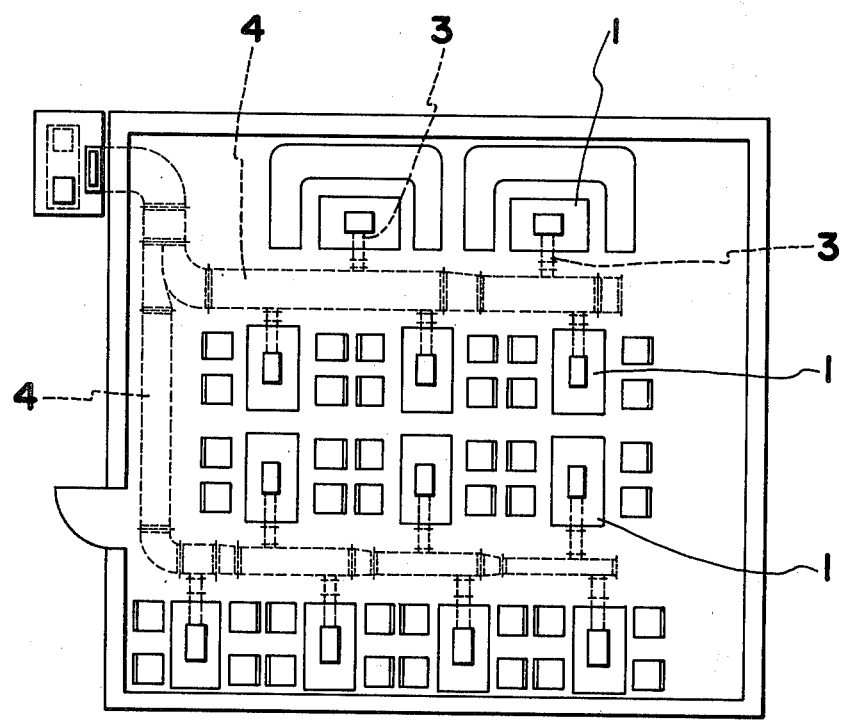
FIG. 2 illustrates a system to introduce smokes from roasters on respective tables into a collecting forced exhaust duct provided under a floor.
Figure 3:
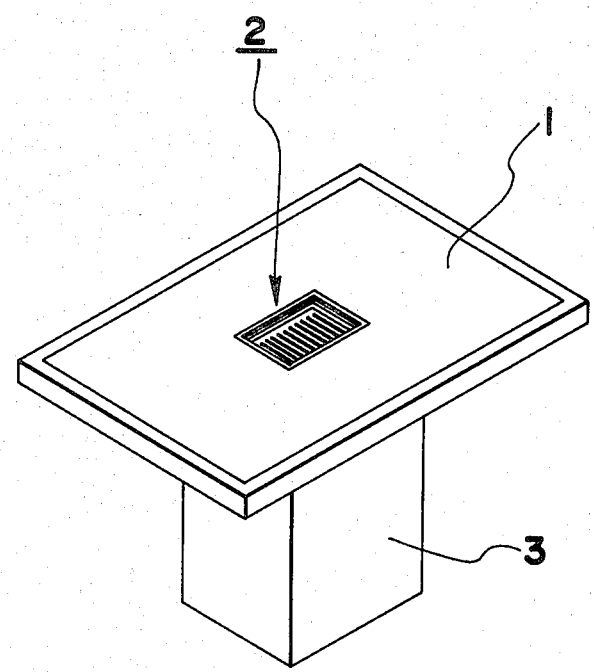
FIG. 3 is a perspective view of a cooking table in which a roaster of the invention is provided.

FIGS. 2 and 3 show an embodiment of a roaster constructed in accordance with the invention. Smoke including oil from a plurality of roasters 2 on respective tables 1 enter a collecting exhaust duct provided under a floor through respective smoke exhaust cylindrical members 3. The roaster of the invention usable for such a system is shown in FIGS. 4 through 8.

Figure 8:
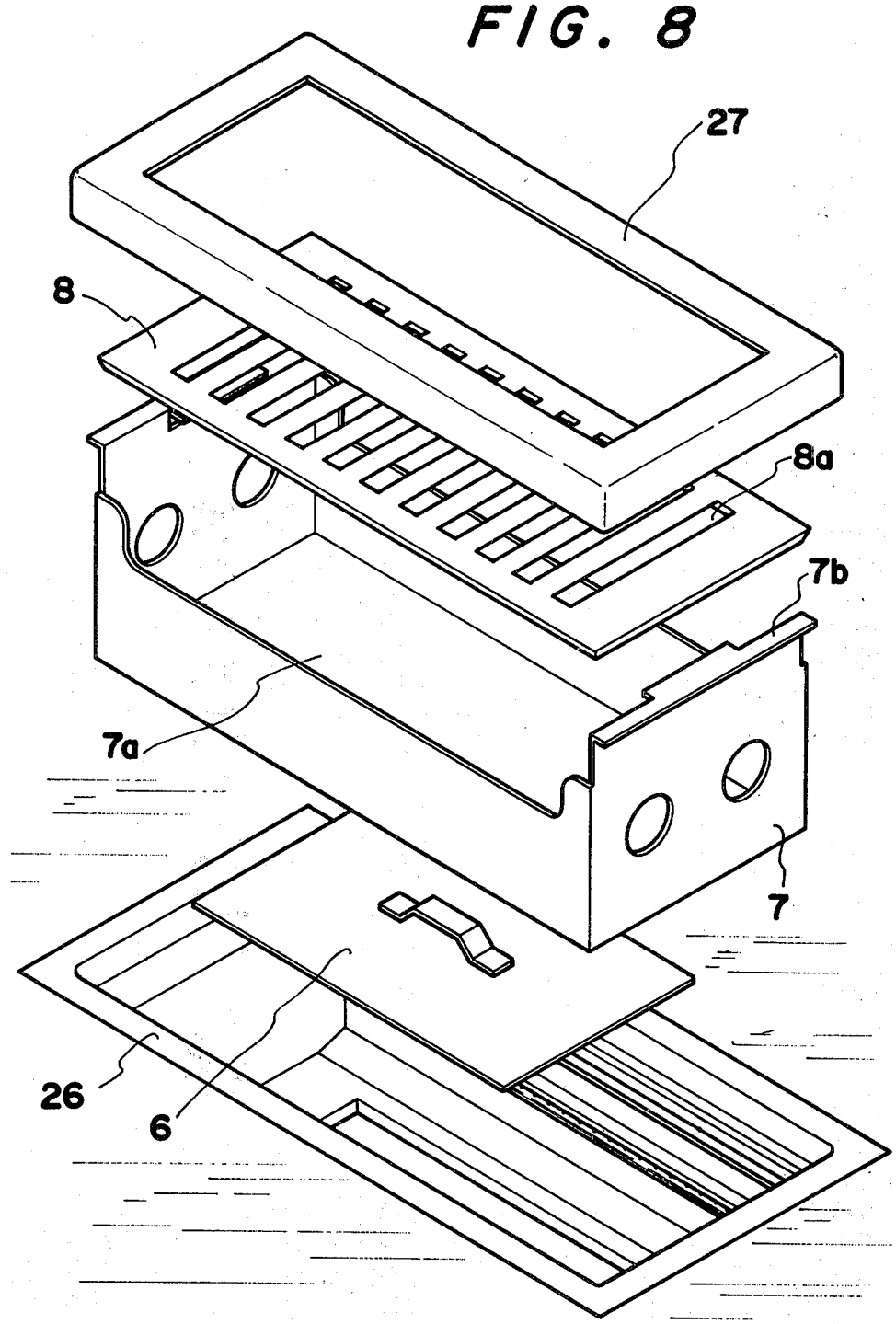
FIG. 8 is an explosive and perspective view of the roaster of the invention.

A roaster body 2 includes an inner body portion 5 which has an upper opening and a cover 6 removably provided at the lower portion as shown in FIG. 8. A juice receiver 7 has openings 7a provided at both of longitudinal portions. The juice receiver 7 is disposed in a spaced manner from the inner body portion 5 and at its flange 7b mounted on shoulders of a frame 26 which is a portion of the table 1.

Figure 6:
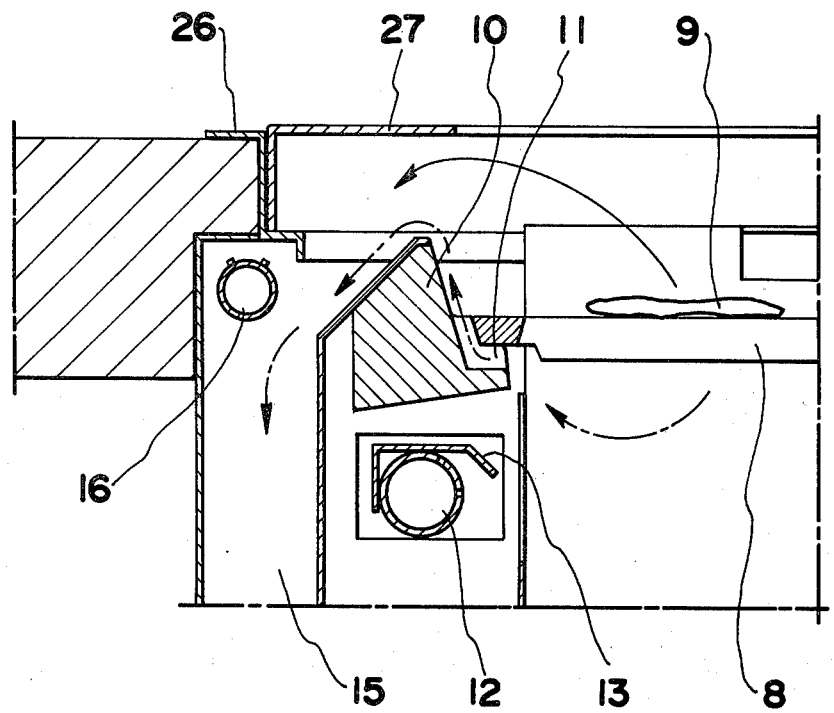
FIG. 6 is an enlarged sectional view of a portion of the roaster of the invention which serves to forcedly guide an exhaust gas into a smoke exhaust passage.

A mesh-like cooking plate 8 serves to place cooking material such as meat 9. The cooking plate 8 has a plurality of holes 8a provided in a spaced manner and is mounted on a tripod 10 which is in turn mounted on the upper portion of the inner body portion 5. As shown in FIG. 6, the tripod 10 has L-shaped protrusions 11 provided thereon and spaced from each other. The cooking plate is mounted on the L-shaped protrusions so as to form an exhaust gas guide passage between the adjacent protrusions to guide an exhaust gas out of the juice receiver.

Figure 7:
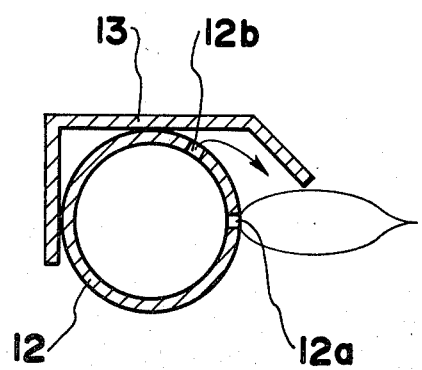
FIG. 7 is an enlarged sectional view of a portion of a gas burner used in the roaster of the invention.

A gas burner 12 is positioned between the juice receiver 7 and the inner body portion 5 to direct a flame toward the openings 7a in the juice receiver 7. In order to save the fuel expenses and to be able to adjust the heating power, the gas includes much air. To avoid the extinguishment of flame due to higher injection of flame, the burner 12 may preferably have main gas injection holes 12a and also pilot gas injection holes 12b provided as shown in FIG. 7. A guide member 13 serves to positively direct the pilot flame toward the root of the main flame.

Figure 4:
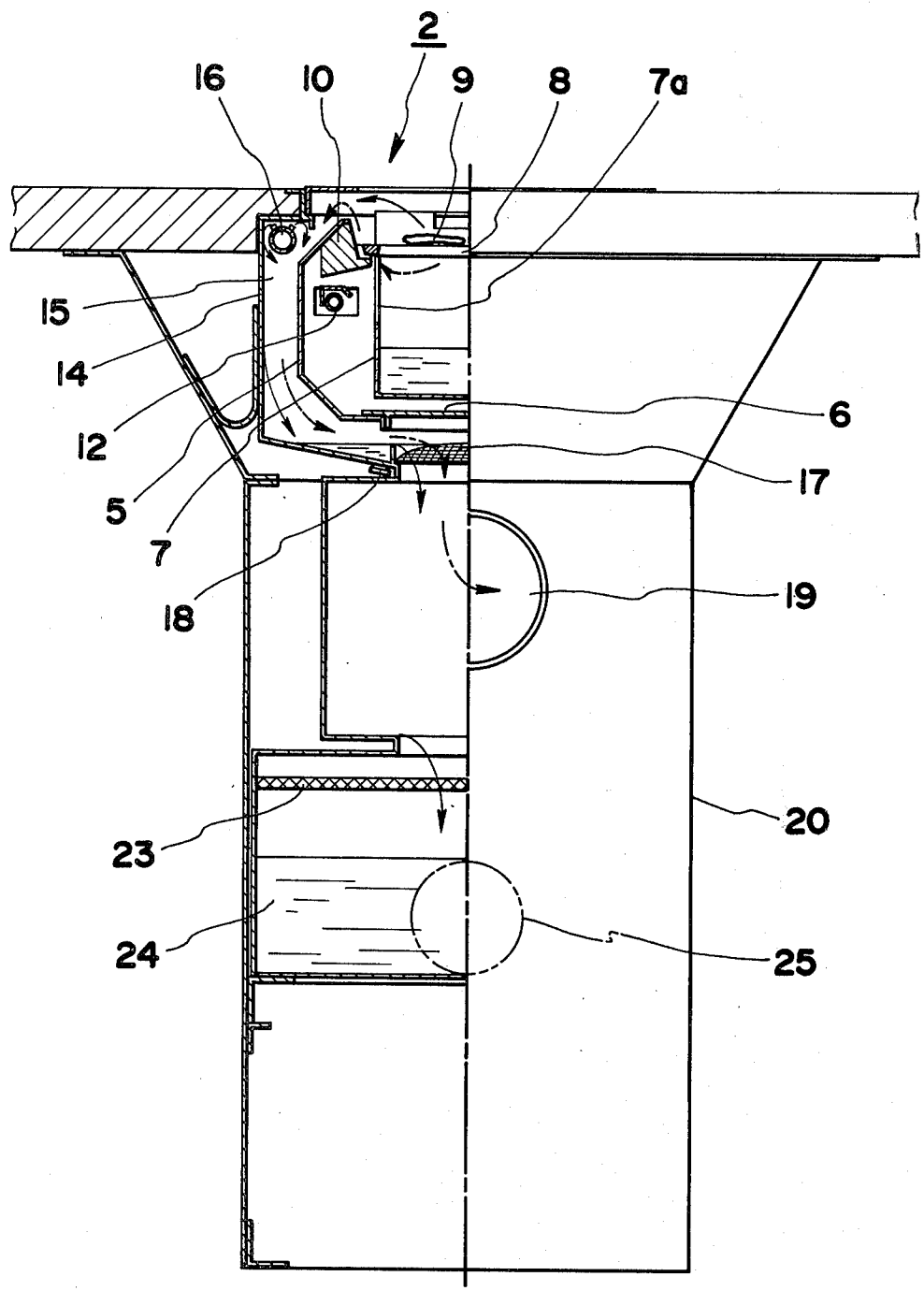
FIGS. 4 and 5 are side elevational views of the roaster of the invention with a half portion taken in section.
Figure 5:
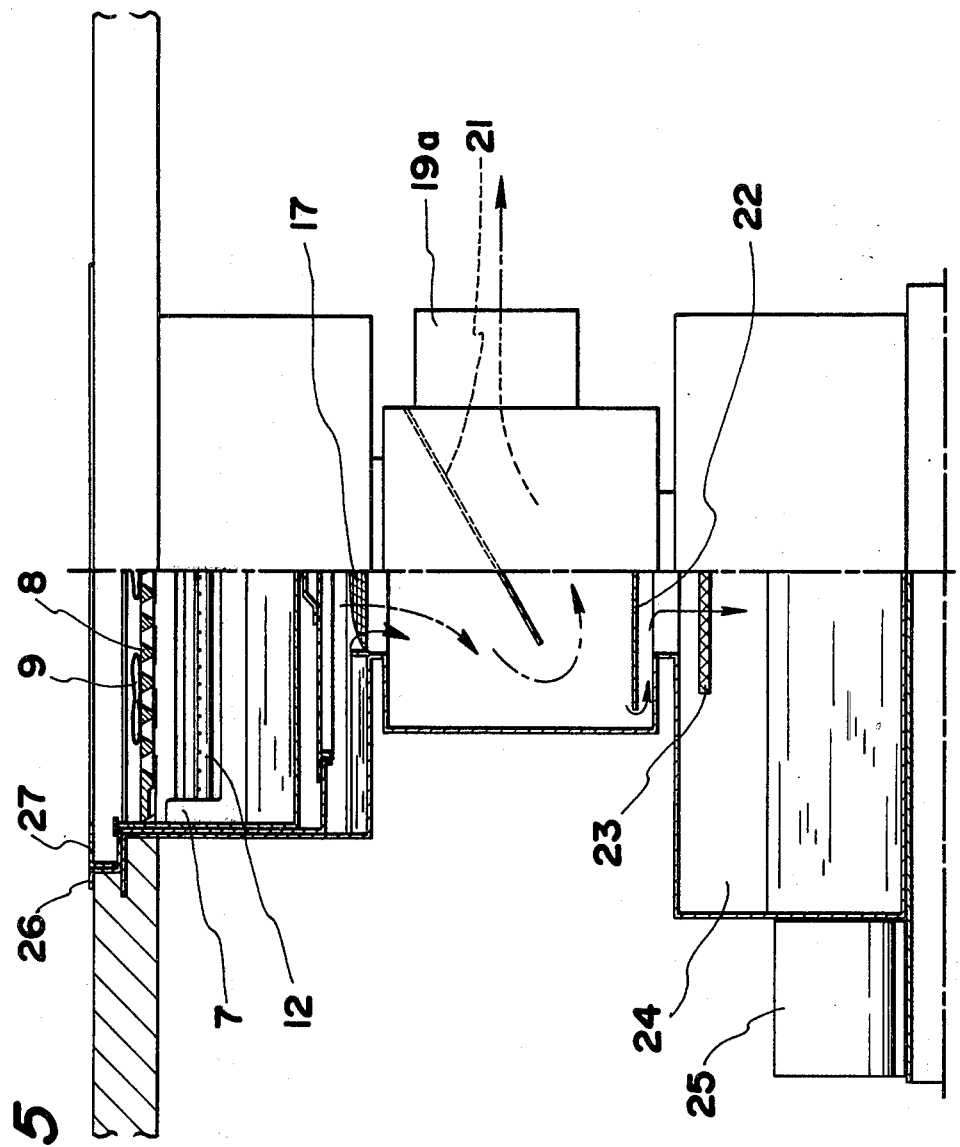

The roaster body 2 also includes an outer body portion 14 which has an upper opening and is positioned in a spaced manner from the inner body portion 5. As shown in FIGS. 4 and 6, the outer body portion 14 is arranged in a substantially parallel manner to the inner body portion 5. A lamp smoke exhaust passage 15 is formed between the inner and outer body portions 5 and 14 to exhaust the lamp smoke therethrough.

A water jet type cleaning nozzle 16 is disposed at the upper portion of the lamp smoke exhaust passage 15 to remove the dust such as oil or burnt particles out of the wall of the lamp smoke exhaust passage to clean it. The cleaning nozzle 16 is positioned so as not to obstacle the flow of the exhaust gas and has a plurality of water jet holes provided to be directed in various directions. A mesh-like filter 17 is exchangeably provided at the lower opening of the outer body portion 14 to remove relatively larger dusts such as burnt particles out of the cleaning water. A drain valve 18 may be preferably provided at the bottom of the outer body adjacent to the filter 17.

A casing 20 is connected to the lower end of the outer body portion 14 and communicates through an opening 19a with an exhaust cylindrical member 19 which is in turn connected to a forced smoke exhaust duct not shown. Guide plates 21 and 22 are disposed within the casing 20. The guide plates 21 and 22 serve to guide only smoke into the exhaust cylindrical member 19 without accompanying the cleaning water and to guide the cleaning water toward a filter 23. The filter 23 serves to remove oil out of the cleaning water including oil which passes through the filter 17 to remove the burnt particles. A water receiver 24 receives the cleaning water which passes through the filter 23. The cleaning water within the water receiver 24 is circulated by a pump 25 to be introduced into the cleaning nozzle 16.

In the drawings, a frame 26 is shown to be provided at the table 1 so as to support the roaster body 2. A frame cover 27 may be preferably provided at the frame 26.

In operation, the smoke which is generated from cooking material on the cooking plate 8 passes through the smoke exhaust passage 15 as indicated by an arrow in FIGS. 4 and 6 and then through the exhaust cylindrical member 19 to be introduced into the collecting exhaust duct. Since sucking means not shown sucks the smoke, it is never filled in the room. The dusts such as oil and burnt particles which tend to adhere to the wall of the smoke exhaust passage 15 are cleaned by the water injected from the cleaning nozzle 16 which will be operated if necessary. Thus, it will be noted that the smoke exhaust passage 15 is never closed or choked. Also, no bad smell will be given out by the rotted dusts otherwise adhering to the wall of the smoke exhaust passage 15. This means that the inner and outer body portions 5 and 14 are not required to be manually disassembled and cleaned. The burnt particles are removed by the mesh-like filter 17 out of the cleaning water while the oil is removed by the filter 23 out of cleaning water. It should be noted that the oil dust which tends to be scattered from the cooking material is sucked together with smoke to enter the smoke exhaust passage 15, which prevents the table from being contaminated by the oil dust. An exhaust gas which stays under the cooking plate 8 cannot be exhausted through the cooking plate 15 because the cooking material is placed on the cooking plate, which will cause the effectiveness of combustion to be lowered. But, in accordance with the roaster of the invention, the exhaust gas is also sucked together with smoke through the exhaust gas guide passage to enter the smoke exhaust passage 15. This causes the cooking material to be properly roasted. It should be noted that the juice receiver 7 can be prevented from being thermally expanded due to the flame from the burner because the openings 7a in the juice receiver 7 are faced to the burner 12. This means that the juice receiver 7 can be positively engaged with the inner body portion 5. The pilot flames are always directed to the root of the main flame to prevent the latter from being interrupted although much air is included in the fuel gas to save the fuel expenses and to provide the higher heating power to the cooking material.

Although one preferred embodiment of the invention has been described and illustrated with reference to the accompanying drawings, it will be understood by those skilled in the art that it is by way of example and that various changes and modifications may be made without departing from the spirit and scope of the invention, which is intended to be defined only to the appended claims.

What is claimed is;

1. A roaster comprising a roaster body having an inner body portion and an outer body portion; a mesh-like cooking plate removably mounted on said inner body portion to place cooking material thereon; a juice receiver containing water therein and disposed under said cooking plate; a gas burner disposed in a spaced manner from said juice receiver to direct a flame toward openings in said juice receiver; a smoke exhaust passage formed between said inner and outer body portions; a water jet type cleaning nozzle disposed at an upper portion of said smoke exhaust passage; an exhaust gas guide passage provided between said cooking plate and said inner body portion so as to communicate with said smoke exhaust passage; a mesh-like filter provided at a lower opening of said outer body portion; and an exhaust casing provided so as to communicate with said outer body portion and also collecting exhaust duct including sucking means and having a filter provided to remove oil out of the cleaning water.

2. A roaster as set forth in claim 1 further comprising a water receiver to receive the cleaning water which oil is removed out of by a filter provided at an upper portion of said water receiver and a pump to circulate the water from said water receiver to said cleaning nozzle.

3. A roaster as set forth in claim 1, and wherein said juice receiver has openings provided to face said gas burner.

4. A roaster as set forth in claim 1, and wherein said gas burner comprises main gas injection holes and pilot gas injection holes and a guide member to guide pilot flames from said pilot gas injection holes toward the root of a main flame from said main gas injection holes.

5. A roaster as set forth in claim 1, and wherein said exhaust gas guide passage is formed between adjacent protrusions on said inner body portion at its upper shoulder hich receive said cooking plate to support it.

6. A roaster as set forth in claim 1, and wherein said cleaning nozzle is positioned so as not to obstacle the flow of said exhaust gas and has a plurality of water jet holes provided to direct in various directions.

7. A roaster as set forth in claim 1 further comprising a frame provided in a table to support said roaster body and having a frame cover to guide oil dust scattered toward said frame at its periphery.

* * * * *